United States Patent [19]

Davis et al.

[11] Patent Number: 4,653,062
[45] Date of Patent: Mar. 24, 1987

[54] CHEMICAL OXYGEN-IODINE LASER

[75] Inventors: Steven J. Davis, Londonberry, N.H.; Harvey V. Lilenfeld, St. Louis, Mo.; David K. Neumann, Colorado Springs, Colo.; Phillip D. Whitefield, St. Charles, Mo.

[73] Assignee: The United States of America as represented by the Secretary of the Air Force, Washington, D.C.

[21] Appl. No.: 745,970

[22] Filed: Jun. 18, 1985

[51] Int. Cl.⁴ ............................................. H01S 3/095
[52] U.S. Cl. ........................................................ 372/89
[58] Field of Search ............................. 372/89, 55, 58

[56] References Cited

U.S. PATENT DOCUMENTS

| 4,068,196 | 1/1978 | Hohla et al. | |
| 4,210,877 | 7/1980 | Pleasance et al. | |
| 4,318,060 | 3/1982 | Davis et al. | 372/70 |
| 4,488,311 | 12/1984 | Davis et al. | 372/89 |

OTHER PUBLICATIONS

D. J. Benard et al.—Efficient Operation of a 100-W Transverse-Flow Oxygen-Iodine Chemical Laser—Applied Physics Letters, 34(1), pp. 40-41 (Jan. 1, 79).

C. E. Wiswall et al.—Operation of an ICI Fueled Oxygen-Iodine Chemical Laser—Applied Physics Letters, 45(1), pp. 5-7, (Jul. 1, 84).

Primary Examiner—Gene Wan
Attorney, Agent, or Firm—Thomas L. Kundert; Donald J. Singer

[57] ABSTRACT

An oxygen-iodine laser system that includes a source of gaseous singlet delta oxygen $O_2('\Delta)$ and a source of gaseous iodine monochloride, ICl, that directs their respective gases to manifolds and then to a mixing reacting nozzle. The nozzle discharges the mixed gases into a lasing cavity. When mixed the ICl dissociates into atomic iodine, I, and atomic chlorine, Cl, in the presence of the excited oxygen. The atomic iodine is subsequently excited to $I(^2p_{\frac{1}{2}})$ lasing state by the excited oxygen. The lasing cavity, which includes optical means for extracting radiation, includes exhaust ports connected to an exhaust system. The advantage of using ICl in the laser rather than conventional source of atomic iodine is that for a given temperature the operating pressure of the laser can be higher without encountering efficiency reducing condensation of the iodine.

3 Claims, 1 Drawing Figure

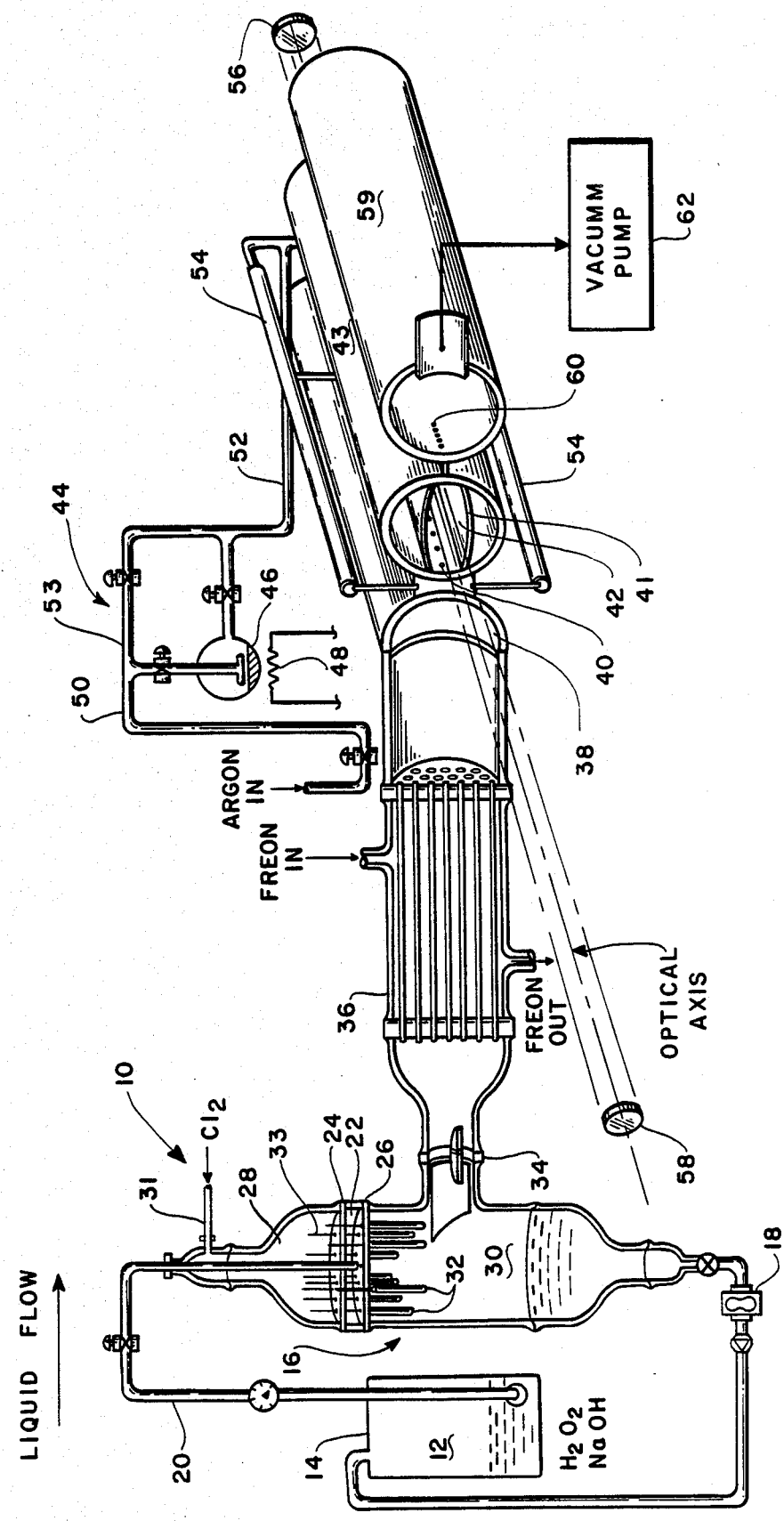

CHEMICAL OXYGEN-IODINE LASER

STATEMENT OF GOVERNMENT INTEREST

The invention described herein may be manufactured and used by or for the Government for Governmental purposes without the payment of any royalty thereon.

BACKGROUND OF THE INVENTION

This invention is in the chemical laser field and more particularly it is in the field of chemical oxygen-iodine laser (COIL) devices. COIL devices in the past have typically employed chemically produced singlet delta, molecular oxygen $O_2('\Delta)$, to dissociate molecular iodine, $I_2$, into atomic iodine, I, and excite the atomic iodine to a lasing state. An example of one such laser is disclosed in an article by Benard et al appearing in Applied Physics Letters, Vol. 34, No. 1, 1, Jan. 79. The Benard et al article includes a disclosure of a singlet delta oxygen generator that functions by bubbling chlorine gas, $Cl_2$, through a hydrogen peroxide, $H_2O_2$, and sodium hydroxide, NaOH, mixture.

A more efficient excited oxygen generator is disclosed in a U.S. Pat. No. 4,558,461 to McDermott et al and assigned to the United States Government. The excited oxygen generator employed in the McDermott et al patent utilizes a tubular reaction chamber. Chlorine gas and a liquid mixture of hydrogen peroxide and sodium hydroxide are introduced into a tubular reaction chamber. The interior walls of the reaction chamber are wetted by the liquid during operation and the chlorine gas flows through the center of the tube. This results in a gas/liquid interace of circular cross-section that is an efficient producer of singlet oxygen. The prior art discussed above discloses reacting molecular iodine and singlet oxygen to form atomic iodine which is subsequently excited to a lasing state by the singlet oxygen. The molecular iodine is provided by flowing an Argon carrier gas over $I_2$ crystals to seed the carrier gas with $I_2$ vapor.

Chemically pumped iodine lasers have been shown to be efficient scaleable devices capable of producing continuous wave (CW) operation over long periods at significant output powers. However a significant disadvantage to present COIL systems that use molecular iodine, $I_2$, as the source for atomic iodine, I, is the lower vapor pressure of $I_2$. If for example, supersonic operation of a coil were desired, delivery of $I_2$ at pressures exceeding its vapor pressure in the gas stream would be required. Under these conditions of increased pressures, Van der Waals' complexes of $I_2$ can form and lead to condensation of the $I_2$ that results in $I_2$ particle formation, liquid or solid, that seriously degrades laser operation. It is possible that future COILs may be high pressure devices employed in laser weapon systems, or as a laser driver for inertial confinement fusion. In these applications condensation could be a serious problem if known methods were used to obtain atomic iodine.

SUMMARY OF THE INVENTION

The present inventions overcomes the problem of $I_2$ condensation in COIL devices discussed above by utilizing gaseous iodine monochloride as the source of atomic iodine rather than molecular iodine. The vapor pressure of ICl at, for example, 300 degrees Kelvin (300 K) is 5300 pascals (Pa) whereas the vapor pressure of $I_2$ at 300 K is 63 Pa. The vapor pressure advantages of ICl relative to $I_2$ increase as the operating temperatures of COIL devices are lowered. Thus, at a given temperature the delivery pressure that can be obtained for a COIL device employing ICl as a reactant gas is greater than the pressure that can be obtained for a COIL device using $I_2$ is a reactant.

Accordingly it is an object of this invention to improve a COIL that will operate satisfactorily at low temperatures and high pressure levels to provide high power.

This is accomplished by providing a singlet delta oxygen generator connected to an oxygen manifold that is connected to a mixing nozzle bank. The output of the oxygen generator supplies singlet oxygen to the manifold which then supplies the singlet oxygen to the nozzles. An ICl vapor generator is connected to an ICl manifold whose output is also connected to the bank of mixing nozzles. The mixing nozzles direct a flow of ICl and singlet oxygen into a laser cavity. When the ICl is mixed with singlet oxygen the ICl dissociates into atomic iodine and atomic chlorine. The atomic iodine is subsequently excited to the $I(^2P_{\frac{1}{2}})$ lasing state by the singlet oxygen. The laser cavity reactants are the ported into an exhaust system. Thus, a COIL device is provided where the atomic iodine source used is other than molecular iodine.

BRIEF DESCRIPTION OF THE DRAWINGS

The drawing is a schematic illustration of a chemical oxygen-iodine laser constructed and operated in accordance with the invention.

DETAILED DESCRIPTION OF THE INVENTION

Referring now to the drawing, at the left side of the drawing is illustrated a singlet delta oxygen generating section 10 of a known type whose method and theory of operation was discussed in the background discussion in this specification. A hydrogen peroxide/sodium hydroxide, $H_2O_2$/NaOH, solution 12 in container 14 is transferred via conduit 20 to a singlet delta oxygen generator 16 maintained at low pressure by a vacuum pump 62 discussed hereafter. The solution is supplied to a midchamber 22 formed by horizontal walls 24 and 26 that partition generator 16 into three chambers 22, 28, and 30. Wall 26 has a plurality of tubular reaction columns 32 mounted therein that form reaction chambers. The upper end of the tubular columns open into midchamber 22 so that the $H_2O_2$/NaOH solution therein will wet the internal surfaces of the reaction columns 32 as it flows through them into chamber 30 by gravity flow. The solution is collected at the bottom of chamber 30 and recirculated back into container 14 by pump 18. Molecular chlorine, $Cl_2$, from a suitable source (not shown) is injected into upper chamber 28 via conduit 31. Floor 24 of chamber 28 has a plurality of chlorine injection tubes 33 mounted therein that extend upwardly into chamber 28 and downwardly into the reaction columns 32. As is apparent there is one chlorine injection tube for each reaction column and they are aligned with each other so that when the $H_2O_2$/NaOH solution and the $Cl_2$ gas is flowing they will react in the columns in the manner discussed above, and described in the above referenced U.S. Pat. No. 4,558,451, to form singlet delta molecular oxygen that is collected in chamber 30.

The singlet oxygen in chamber 30 exits the singlet oxygen generator and passes through spray trap 34 and cold trap 36. The spray trap removes any liquid from the flow and the cold trap freezes out any water vapor. These traps are conventional devices for removing unwanted constituents from the flow of singlet oxygen. The flow from cold trap 36 enters oxygen manifold 38 that is in communication with a bank of mixing nozzles 40. The oxygen flows through the nozzles into laser cavity 42. The cavity is formed by a suitable sealed enclosure means 43.

An ICl vapor generator 44 consists of a heated glass cell 46 containing ICl liquid that is heated by suitable heating means, such as resistance heater 48, to generate ICl vapors. An infra-red lamp could also be used as a heat source. Argon gas from a suitable source (not shown) is directed into glass cell 46, via conduit 50, as a carrier gas in which ICl vapors are entrained and then delivered, via conduit 52, to ICl manifold 54. It was found necessary to add a bypass line 53 in the Argon flow lines to add Argon to the ICl carrying Argon for improving mixing in the nozzle section discussed hereafter. The ICl manifold supplies gaseous ICl to the mixing nozzles which discharge the ICl into the laser cavity along with the singlet oxygen.

The internal passageways of the mixing nozzles have not been shown here because the fabrication as such nozzles are well known to those skilled in this art. The same is true of laser cavity 42 so the details of mounting laser cavity mirrors 56 and 58, and laser cavity flow shrouds 41, have not been shown. The reactants from laser cavity 42 are discharged into exhaust manifold 59 through exhaust passageways or ports 60. Exhaust manifold 59 is connected to a high capacity vacuum pump 62 which provides a pressure differential across the laser system that makes the reactants flow properly and maintains a suitable pressure in the laser cavity. The laser was operated with laser cavity pressures in the range of 1 to 3 torr.

The ICl in the laser cavity dissociates into atomic iodine and atomic chloride, in the presence of the singlet delta oxygen and the atomic iodine is subsequently excited to the $I(^2P_{\frac{1}{2}})$ lasing state by the singlet oxygen. It was shown that such dissociation of the ICl and excitation of the atomic iodine occurred by utilizing Electron Spin Resonance Spectroscopy to monitor atomic iodine and atomic chlorine formation, and Optical Emission Spectroscopy to monitor the $I(^2P_{\frac{1}{2}})$ lasing state of atomic iodine. The details of experiments that were performed to provide the operation of this invention and to compare it to the operation of a COIL device operating on $I_2$ rather than ICl are disclosed in an article entitled "Operation Of An ICl Fueled Oxygen-Iodine Chemical Laser" coauthored by H. V. Lilenfeld one of the inventors of this invention and appearing in Applied Physics Letters, Vol. 45, No. 1, July 1984.

Thus, while preferred constructional features of the present invention are embodied in the structure illustrated herein, it is understood that changes and variations may be made by those skilled in the art without departing from the spirit and scope of the invention.

We claim:

1. A chemical oxygen-iodine laser system for producing a beam of high energy coherent radiation comprising:

a singlet molecular oxygen generating means for producing a gaseous flow of oxygen molecules in an excited state, an iodine monochloride generating means for producing a gaseous flow of iodine monochloride, mixing nozzles means for receiving gaseous reactants and discharging these reactants in a mixing flow, a singlet oxygen manifold means connected by conduit means to said singlet oxygen generating means and to said mixing nozzle means for providing a flow of gaseous singlet oxygen to said mixing nozzle means, an iodine monochloride manifold means connected to said iodine monochloride generating means and to said mixing nozzle means for providing a flow of gaseous iodine monochloride to said mixing nozzle means, laser cavity means formed by a sealed enclosure means connected to said mixing nozzle means for receiving flow of gaseous singlet oxygen and iodine monochloride from said mixing nozzle means, whereby iodine monochloride reactants with singlet oxygen to form atomic chlorine and atomic iodine and the atomic iodine formed subsequently reacts with singlet oxygen to raise the atomic iodine to a lasing state and permit the extraction of a laser beam from said laser cavity means, and exhaust manifold means connected to said laser cavity for extracting the reactants from said laser cavity.

2. The laser system recited in claim 1 wherein said exhaust manifold means includes a vacuum pump for reducing the internal operating pressures of the components of the laser system.

3. The laser recited in claim 1 wherein the laser is operated with a laser cavity pressure in the range of 1 to 3 torr.

* * * * *

UNITED STATES PATENT AND TRADEMARK OFFICE
CERTIFICATE OF CORRECTION

PATENT NO. : 4,653,062

DATED : March 24, 1987

INVENTOR(S) : Steven J. Davis et al

It is certified that error appears in the above-identified patent and that said Letters Patent is hereby corrected as shown below:

At column 2, line 22, "the" should read --then--.

At claim 1, (column 4, line 32), --the mixing reacting-- should follow "receiving".

At claim 1, (column 4, line 34), "reactants" should read --reacts--.

Signed and Sealed this

Fifteenth Day of September, 1987

*Attest:*

DONALD J. QUIGG

*Attesting Officer*　　*Commissioner of Patents and Trademarks*